(12) United States Patent
Butters et al.

(10) Patent No.: US 6,517,110 B1
(45) Date of Patent: Feb. 11, 2003

(54) DYNAMICALLY DEPLOYED DEVICE SHIELD

(75) Inventors: Nathan R. Butters, Tempe, AZ (US); William V. Tamminen, Mesa, AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/644,853

(22) Filed: Aug. 24, 2000

Related U.S. Application Data

(60) Provisional application No. 60/154,954, filed on Sep. 21, 1999.

(51) Int. Cl.[7] ............................................. B60R 21/06
(52) U.S. Cl. ..................................... 280/749; 280/730.2
(58) Field of Search ............................. 280/730.2, 749

(56) References Cited

U.S. PATENT DOCUMENTS

| | | | |
|---|---|---|---|
| 3,897,961 A | * 8/1975 | Leising et al. ........... | 280/730.1 |
| 4,178,017 A | 12/1979 | Ishi et al. | |
| 4,830,401 A | 5/1989 | Honda | |
| 5,062,664 A | * 11/1991 | Bishop et al. ........... | 280/728.2 |
| 5,149,130 A | 9/1992 | Wooley et al. | |
| 5,160,164 A | 11/1992 | Fischer et al. | |
| 5,322,322 A | 6/1994 | Bark et al. | |
| 5,382,047 A | 1/1995 | Gajewski | |
| 5,385,366 A | 1/1995 | Frank et al. | |
| 5,429,385 A | 7/1995 | Kamiji et al. | |
| 5,464,246 A | 11/1995 | Castro et al. | |
| 5,470,105 A | 11/1995 | Rose et al. | |
| 5,480,181 A | 1/1996 | Bark et al. | |
| 5,520,415 A | 5/1996 | Lewis et al. | |
| 5,547,214 A | * 8/1996 | Zimmerman et al. .... | 280/730.1 |
| 5,553,887 A | * 9/1996 | Karlow et al. ........... | 280/730.2 |
| 5,580,081 A | 12/1996 | Berg et al. | |
| 5,628,527 A | 5/1997 | Olson et al. | |
| 5,967,603 A | * 10/1999 | Genders et al. ........ | 297/216.13 |
| 6,045,151 A | * 4/2000 | Wu .......................... | 280/728.3 |
| 6,095,551 A | 8/2000 | O'Docherty | |
| 6,145,879 A | * 11/2000 | Lowe et al. ............. | 280/743.1 |
| 6,189,916 B1 | * 2/2001 | Bowers et al. ........... | 280/728.3 |
| 6,220,623 B1 | * 4/2001 | Yokota ..................... | 280/728.2 |
| 6,237,936 B1 | * 5/2001 | Quade et al. ............. | 282/728.2 |
| 6,273,457 B1 | * 8/2001 | Fischer .................... | 280/730.2 |
| 6,276,712 B1 | * 8/2001 | Welch et al. ............. | 280/730.2 |
| 6,279,944 B1 | * 8/2001 | Wipasuramonton et al. ..... | 280/729 |
| 6,378,897 B1 | * 4/2002 | Butters et al. ........... | 280/730.2 |

FOREIGN PATENT DOCUMENTS

| | | | | |
|---|---|---|---|---|
| DE | 4307175 A1 | * 9/1993 | ........... | B60R/21/02 |
| GB | 2220620 A | * 1/1990 | ........... | B60R/21/22 |

* cited by examiner

Primary Examiner—Lesley D. Morris
Assistant Examiner—Paul Royal, Jr.
(74) Attorney, Agent, or Firm—Shaw Pittman LLP

(57) ABSTRACT

A dynamically deployed device shield ("DDDS") including a cover, a loop shield, and a means for attaching the cover and loop shield to a vehicle structure. A dynamically deployed device ("DDD") is contained in the loop shield and the loop shield is in turn contained in the cover. Upon deployment, a tear section in the cover separates and releases the loop shield and DDD. As the DDD expands and moves towards its location, the loop shield unfolds, guides the deployment of the DDD, and prevents the DDD from overshooting its final location. The shield also prevents the DDD from becoming caught on interior vehicle components and supplements the DDD with a larger protective impact surface. Optionally, a fabric shield is attached to the bottom of the DDDS to cover the area of a vehicle window below the deployed DDD and further increase the protective impact surface of the system.

41 Claims, 10 Drawing Sheets

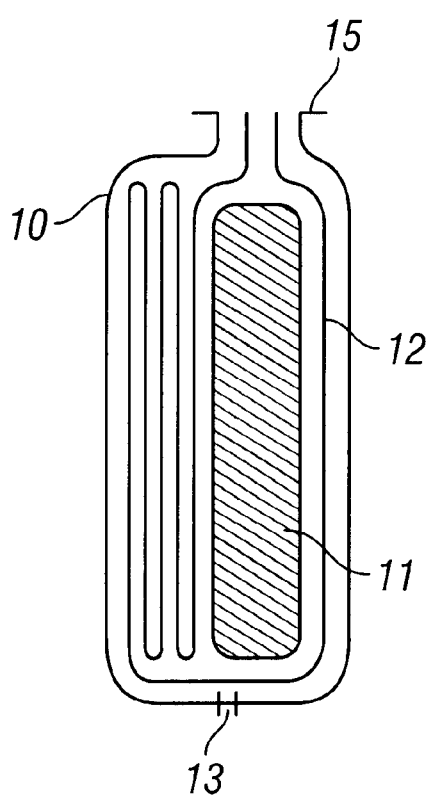
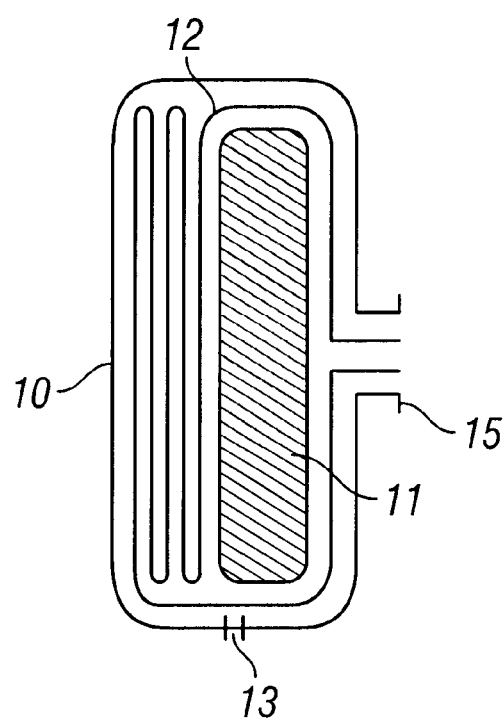
FIG. 1A  FIG. 1B

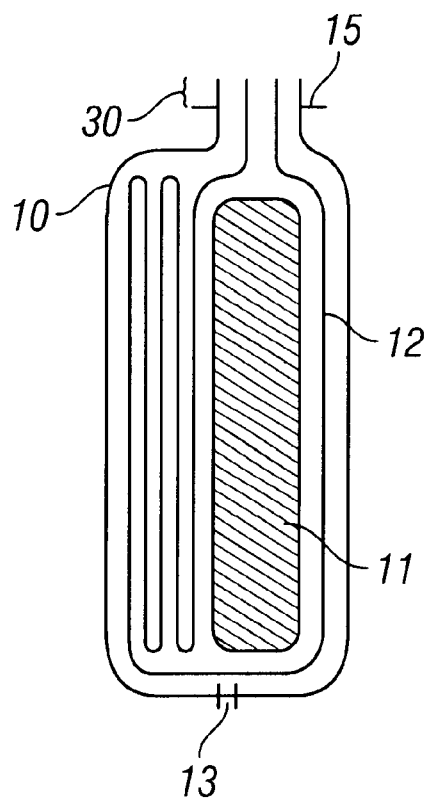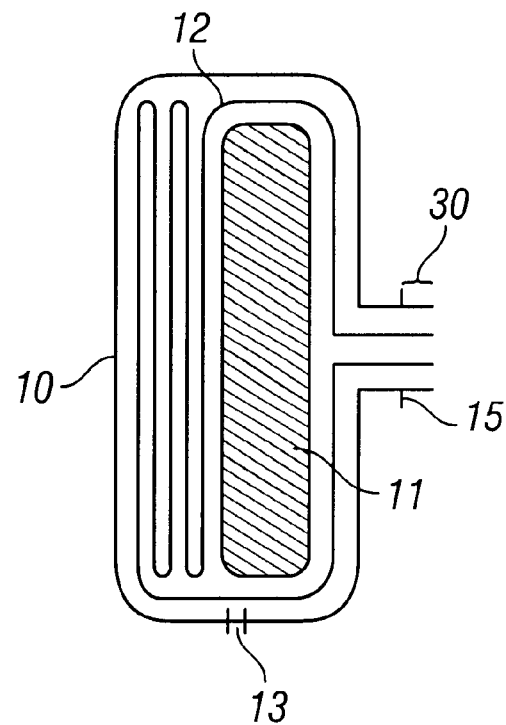
FIG. 3A    FIG. 3B
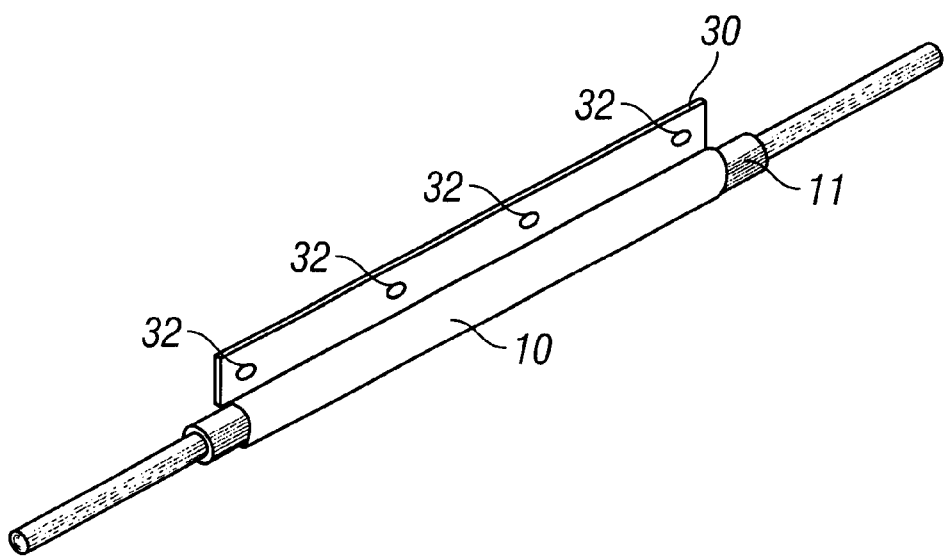
FIG. 3C

DYNAMICALLY DEPLOYED DEVICE SHIELD

This application claims the benefit of the filing date of U.S. Provisional Application No. 60/154,954, filed Sep. 21, 1999.

BACKGROUND

1. Field of the Invention

The present invention relates to the deployment of automobile air bags and other dynamically deployed devices ("DDDs"), and more particularly, to a dynamically deployed device shield (the "DDDS") that increases the protective impact surface of an automobile air bag or other DDD while covering, protecting, and guiding the deployment of the automobile air bag or DDD.

2. Background of the Invention

Dynamically deployed devices, such as automobile air bags, are widely used to protect vehicle occupants during rapid vehicle deceleration, such as the deceleration encountered in a collision. The DDDs used in vehicles are placed throughout the vehicle in strategic locations where occupants can be expected to impact hard components of the vehicle. Generally, DDDs are placed above and below the dashboard on both the driver and passenger side, and are placed along the sides of the vehicle at both head and hip levels. The lower DDDs protect the legs and hips of the occupant, while the upper DDDs cushion the head and upper torso.

During a collision, impact forces deform the vehicle structure and push potentially harmful structural parts into the passenger compartment. During such deformation, parts of the vehicle structure can be severely bent or broken, threatening the safety of the occupant with sharp edges and hard surfaces. The DDD cushions the occupant against the impact and shields the occupant from the sharp edges and hard surfaces. However, the DDD itself is subject to damage from the deformed or broken structural components. Moreover, if the DDD is damaged during deployment by structural components, the DDD will not inflate properly, will not reach the desired fully deployed location, and will not prevent the occupant from striking the structural parts of the vehicle, such as the vehicle dashboard, windshield, doors, side windows, and roof. Thus, to ensure adequate performance of the DDD, the DDD must be shielded from the damaging structural components.

Aside from protecting the DDD and the occupant from harmful vehicle components, another aspect critical to occupant safety is the ability of the DDD to reach and remain in a position between the vehicle structure and the expected location of the occupant during the collision. Conventional DDDs tend to oscillate before settling into the designed deployment location. This oscillation is especially troublesome with tubular structures that are attached at only two ends when deployed, such as the typical design used for side impact protection. Because the DDD is anchored at its longitudinal ends, when the DDD deploys from the storage compartment, inflates, and moves toward a position centered between the anchor points, the DDD tends to overshoot its final deployment location and oscillate back and forth past its final deployment location.

The prior art does not overcome these problems. For example, U.S. Pat. No. 5,429,385 discloses a dashboard-mounted air bag device that uses either a protective cloth or restraint guide to keep the air bag from contacting and damaging the edge of the upper opening of the DDD storage compartment. The protective cloth and restraint guide keep the upper opening from interfering with the deployment of the air bag. However, because neither the protective cloth nor the restraint guide fully envelops the air bag, the device does not fully protect the air bag and does not limit the oscillation of the deploying air bag.

U.S. Pat. No. 5,385,366 discloses an air bag deflection shield for use in a panel-mounted air bag module. The shield is separate from the air bag cover door and is designed to direct the inflating air bag rearwardly and downwardly toward a vehicle occupant and to shield the cover door from contact by the inflating air bag. However, despite the shield, the air bag is still subject to damage from vehicle components and is not restrained against oscillation.

U.S. Pat. No. 5,149,130 discloses a protective, high temperature resistant fabric applied to the air bag to prevent damage to the portion of the inflatable cushion closest to the gas generator. Although the protective fabric prevents heat damage around the gas generator, the fabric does not protect against physical damage from harmful vehicle components in other areas of the air bag. Further, the protective fabric does not restrain the air bag to prevent oscillation.

U.S. Pat. No. 5,160,164 discloses a deflection device for an air bag assembly, which controls the inflation pattern of the air bag so that the air bag does not undesirably contact an occupant's head before it contacts the occupant's torso. The device controls the general deployment direction of the air bag but does not restrain the air bag at full deployment and, therefore, does not prevent oscillation. Further, the device does not protect the air bag itself against damaging contact with vehicle components.

SUMMARY OF THE INVENTION

The present invention is a protective assembly that enhances vehicle occupant protection by increasing the protective impact surface of a dynamically deployed device, such as an automobile inflatable tubular structure. The protective assembly, or dynamically deployed device shield, also provides an attractive housing for the DDD that transforms upon deployment into a shield that protects the DDD against damage by vehicle components, facilitates deployment of the DDD through vehicle trim and interior components, and limits the oscillation and overshoot of the DDD to optimize the protection of the vehicle occupant.

In a preferred embodiment of the present invention, the DDDS shields an inflatable tubular structure, e.g., the side-impact head strike protection structure described in U.S. Pat. No. 5,322,322, which is hereby incorporated by reference in its entirety. Other applications of the present invention include other styles of side-impact head strike and rollover counter measures, front air bags, torso side-impact airbags, and other dynamically deployed devices.

The DDDS comprises a loop shield, a cover, and a means for attaching the DDDS assembly to the vehicle structure. The loop shield is made of a protective material and is positioned to optimize its protective benefits to vehicle occupants without compromising its ability to wrap, restrain, and protect the DDD during deployment, particularly in areas where contact with damaging vehicle interior components is anticipated. The loop shield is attached to the vehicle structure by such means as stitching or mounting hardware. The loop shield has an interior volume that is larger than the volume of the inflated DDD, to hold the inflated DDD within a deployment location most favorable to the vehicle occupant. Thus, when the DDD is in its undeployed state, excess loop material must be gathered and secured.

The excess loop shield material is folded in an accordion fold, or other appropriate fashion, and placed against the DDD. The DDD and the folded loop shield are wrapped in an integral soft cover that is attached to the vehicle structure. The cover incorporates a perforated or stitched tear section that breaks away upon deployment of the DDD to allow both the loop shield and the DDD to expand.

The integral soft cover can be made of a separate piece of material or from the same material as the loop shield. To use the same continuous material of the loop shield, the integral cover is formed by folding back the loop shield material after the point at which it is stitched together and wrapping the loop shield and DDD again with the same loop shield material, but without accordion folds. In this configuration, because the integral cover is continuous to cover the entire length of the DDD and is formed from the same material as the loop shield, the loop shield must also be continuous, i.e., the loop shield is a continuous sleeve.

The loop shield is made of a thin, flexible material strong enough to withstand deployment and occupant contact forces. The preferred material for the loop shield is a woven fabric, such as nylon or polyester. Alternately, other thin, flexible materials are possible, e.g., plastic film and non-woven polyester. The length and width of the loop shield will vary depending upon the required zone of protection.

In a preferred embodiment of the present invention, the loop shield includes vents, e.g., holes, cuts, or slits, along the inboard or outboard side. These vents allow air to freely enter the interior of the loop shield as the loop shield is unfolding and expanding during deployment. The vents prevent a vacuum from developing inside the loop shield that could restrain the loop shield fabric and inhibit the DDD from reaching the intended final location. Further, a vacuum could draw the sides of the loop shield inward and reduce the distance of impact protection provided by the loop shield.

In a further preferred embodiment of the present invention, a fabric shield is attached to the bottom of the DDDS to further increase the protective impact surface of the system. This fabric shield covers the area of a vehicle window below the deployed DDD, reducing the possibility of partial ejection of vehicle occupant limbs and preventing entry of crash debris into the passenger compartment. The fabric shield connects to the bottom of the DDDS and extends to the belt line of the vehicle. A cord runs through the bottom of the fabric shield to draw it down to the belt line when the DDD is deployed. To develop tension and draw the fabric shield down, the fabric shield cord is attached at both ends to the top of the DDD and is routed around fixed points on the vehicle pillars such that when the DDD deploys, the ends of the fabric shield cord are pulled down, the cord travels around the pulleys, and the cord is drawn tightly along the horizontal belt line. With the fabric shield cord drawn tightly, the fabric shield is pulled down to the belt line. The fabric shield cord can be routed around fixed points on the vehicle pillars on one or both sides of the DDD.

In a preferred mode of the present invention, mounting hardware attaches the DDDS to the vehicle structure. Many variations of mounting hardware are possible and depend mostly on the structural requirements of the particular automobile. However, in one preferred embodiment, the DDDS material that forms the loop shield is continued beyond the point at which it is stitched in order to form an extra strip of material for a means of attachment. This extra material is referred to hereinafter as an attachment flap. The attachment flap has incremental holes along its longitudinal axis through which fasteners secure the DDDS to the vehicle structure. Once the loop shield material forms the attachment tab, the material is folded and continued again around the loop shield and DDD to form the integral cover.

An alternate preferred means of attachment uses a push-fitting stud plate, which comprises a long strip of rigid material with fasteners integrally attached at incremental points along its longitudinal axis. In this application, the flat side of the push-fitting stud plate is placed against the DDD, and the DDDS loop shield with the integral cover is wrapped around both the plate and the DDD. The DDDS loop shield and cover have holes through which the push-fitting stud plate fasteners extend and attach the whole assembly to the vehicle structure.

In some applications, inflatable tubular structures are attached at incremental, discrete locations with clips. Because the DDD is not continuously attached to the vehicle, attaching the DDDS at points between the clips would cause the entire DDD and DDDS assembly to pull away from the vehicle structure and "bulge" in an unsightly way. Therefore, in an application that uses incremental attachments such as plastic clips, spring elements and curved plastic strips can be added to more effectively contain the DDD and DDDS and eliminate the "bulging" appearance. The spring element is preferably a metal piano-wire spring that attaches to the vehicle structure at the plastic clip locations and draws the DDD and DDDS assembly tight to the vehicle structure. Alternately, curved plastic strips also attached at the plastic clip locations restrain the DDD and DDDS assembly close to the vehicle structure.

The DDDS operates as follows. When the DDD is inflated, the expansion of the DDD results in forces that detach the cover at the tear section. The DDD further expands and causes the loop shield to unfold. During deployment, the loop shield provides a smooth surface within which the DDD can deploy, preventing the DDD from becoming snagged or caught on any vehicle interior features. As deployment continues, the DDD expands, develops tension, and pulls down and away from the vehicle structure. When the loop shield is completely unfolded, the loop shield restrains the DDD and controls the DDD's ultimate orientation and position. The loop shield also limits the amount the DDD can overshoot its operational position, which in turn reduces or eliminates DDD system oscillation. When the DDD is in its deployed, functional position, the loop shield is under significant tension along its span, providing a tight protective impact surface for the vehicle occupant. In addition, with the preferred fabric shield attached to the bottom of the DDDS and pulled into position by the fabric shield cord, the fabric shield provides an additional protective impact surface from the bottom of the DDDS to the belt line of the vehicle.

Accordingly, it is an object of the present invention to enhance the occupant protection benefits of a dynamically deployed device by increasing the occupant impact surface area with a loop shield and a fabric shield.

Another object of the present invention to guide and control the deployment of a DDD.

Another object of the present invention is to protect the DDD while it is being deployed. For example, the invention can be used to prevent damage to the DDD by interior elements of a vehicle.

Another object of the present invention is to limit the DDD from overshooting its intended final position.

Another object of the present invention is to reduce or eliminate improper orientation, ;such as twisting, of the DDD.

Another object of the present invention is to reduce or eliminate oscillation of the DDD during deployment.

Another object of the present invention is to prevent crash debris from entering the vehicle and to prevent portions of occupants' bodies from exiting the vehicle.

Another object of the present invention is to provide an aesthetically pleasing, integral soft cover for the DDD.

Another object of the present invention is to provide flexibility in positioning the DDD in order to provide maximum protection for a vehicle occupant.

These and other objects of the present invention are described in greater detail in the detailed description of the invention, the appended drawings, and the attached claims.

BRIEF DESCRIPTION OF THE DRAWINGS

FIG. 1A is a cross-sectional view of a DDDS assembly attached at the top, according to a preferred embodiment of the present invention.

FIG. 1B is a cross-sectional view of a DDDS assembly attached at the side, according to a preferred embodiment of the present invention.

FIG. 3A is a cross-sectional view of a DDDS assembly attached at the top with an attachment flap, according to a preferred embodiment of the present invention.

FIG. 3B is a cross-sectional view of a DDDS assembly attached at the side with an attachment flap, according to a preferred embodiment of the present invention.

FIG. 3C is a schematic diagram of an undeployed DDDS assembly that is attached with fasteners through an attachment flap, according to a preferred embodiment of the present invention.

DETAILED DESCRIPTION OF THE INVENTION

Figure 2A:
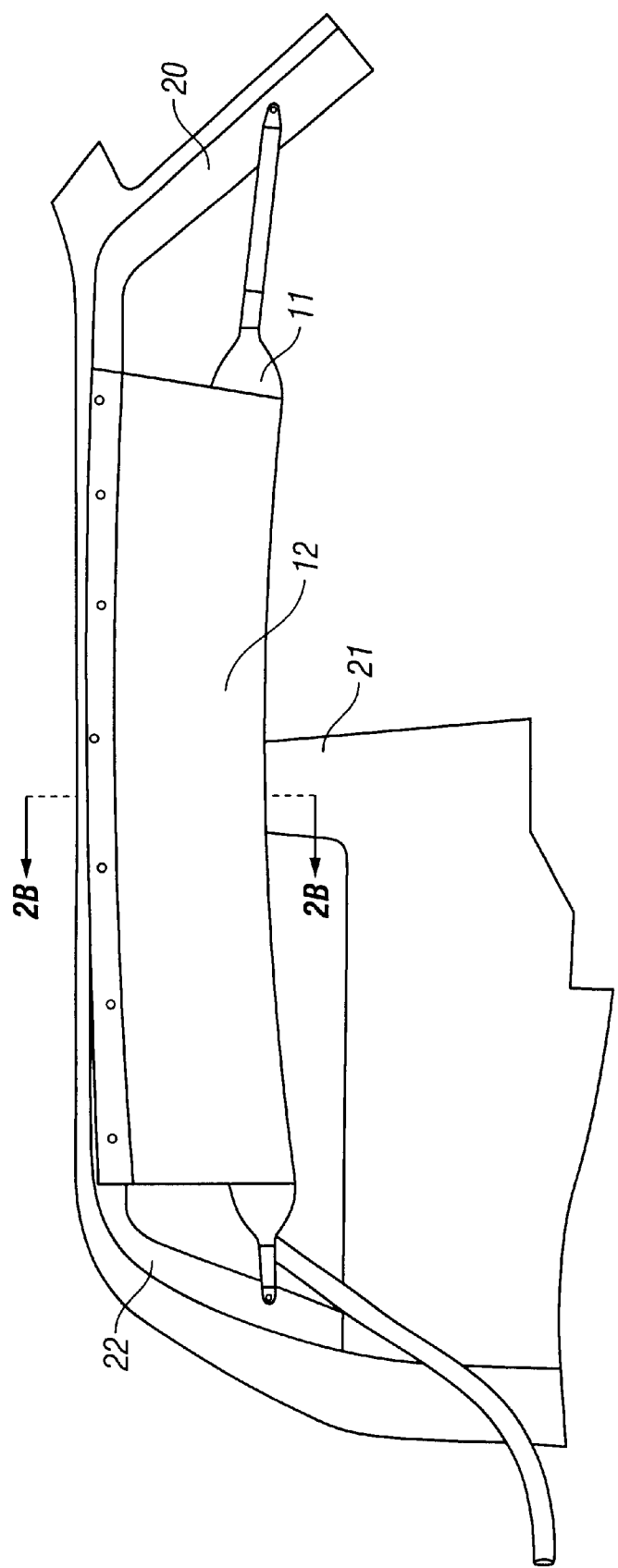
FIG. 2A is a schematic diagram of a deployed DDDS assembly in a vehicle, according to a preferred embodiment of the present invention.

FIGS. 1A and 1B show cross sections of undeployed DDDS assemblies. The DDDS covers and protects DDD 11 and comprises a loop shield 12, a cover 10, and means for attaching the DDDS assembly to the vehicle. Loop shield 12 covers DDD 11. The dimensions of loop shield 12 are selected to hold the inflated DDD 11 at a deployment location most favorable to the vehicle occupant, when DDD 11 is fully deployed. FIG. 2A illustrates the fully deployed DDD 11 held in place by loop shield 12 between A-pillar 20 and C-pillar 22, and in front of B-pillar 21.

As shown in FIGS. 1A and 1B, when DDD 11 is uninflated, loop shield 12 is loose and is folded in an accordion fashion and placed compactly against DDD 11. Cover 10 keeps folded loop shield 12 and DDD 11 together in a tight package secured to the vehicle. The cover and loop shield are attached to the vehicle at means for attachment 15. Cover 10 has a perforated or stitched tear section 13, which separates upon deployment, releases cover 10, and permits loop shield 12 and DDD 11 to expand.

Loop shield 12 and cover 10 can be manufactured from a single strip of protective material or from multiple pieces of material joined together. A preferred embodiment of the present invention uses a single strip of material that is routed from means for attachment 15 around DDD 11 and back to means for attachment 15 to form loop shield 12. The same strip of material continues from means for attachment 15 and back around loop shield 12 and DDD 11 to form cover 10. After forming cover 10, the end of the strip is attached once again at means for attachment 15. Routing the strip in this manner forms two loops, loop shield 12 and cover 10, both with their ends attached at means for attachment 15. Additionally, in this configuration, cover 10 and loop shield 12 span the entire length of DDD 11 to provide enhanced impact protection in all passenger compartment locations.

As opposed to using a single strip of protective material, an alternate embodiment of the present invention forms loop shield 12 and cover 10 from multiple pieces of material joined at means for attachment 15. In this configuration, cover 10 spans the entire length of DDD 11, but loop shield 12 is narrow and is positioned at a particular location along DDD 11, e.g., in front of a window opening. Optionally, with narrow loop shields, more than one loop shield could be placed along the length of DDD 11 at specified locations.

Loop shield 12 is made of a thin, flexible material strong enough to withstand deployment forces and to hold the DDD 11 in position with minimal oscillation. The preferred material for an automotive application is a woven fabric, such as nylon. The length of loop shield 12 varies depending on the optimal deployment location of DDD 11. The width of the loop shield 12 varies depending on the required zone of protection for DDD 11. However, in a preferred embodiment, loop shield 12 spans the entire length of DDD 11 to protect the entire DDD 11 and provide impact protection for all vehicle occupants in all locations.

Figure 2B:
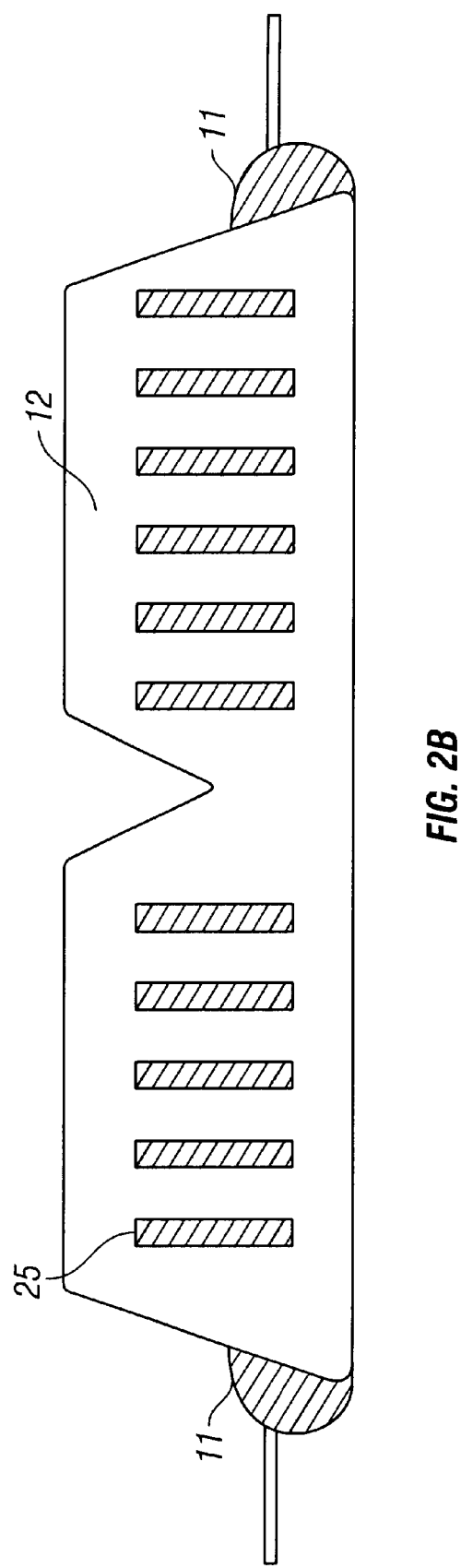
FIG. 2B is schematic diagram of a deployed DDDS assembly with vents through the loop shield, according to a preferred embodiment of the present invention.
Figure 2E:
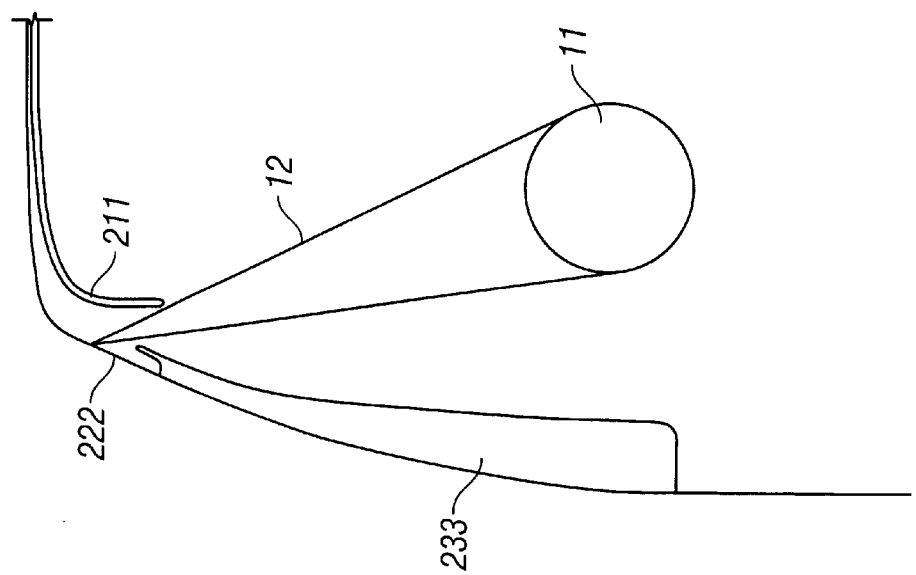
FIG. 2E is a cross-sectional view of the deployed DDDS assembly shown in FIG. 2A.
Figure 2D:
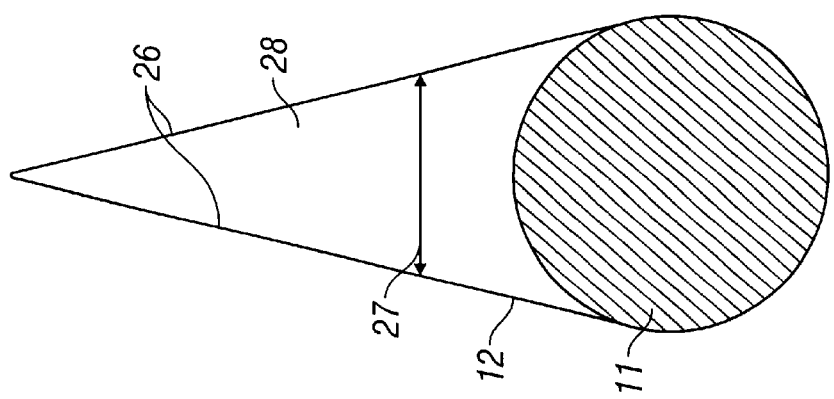
FIG. 2D is a cross-sectional view of a deployed DDDS assembly without a vacuum in the interior volume of the loop shield, according to a preferred embodiment of the present invention.
Figure 2C:
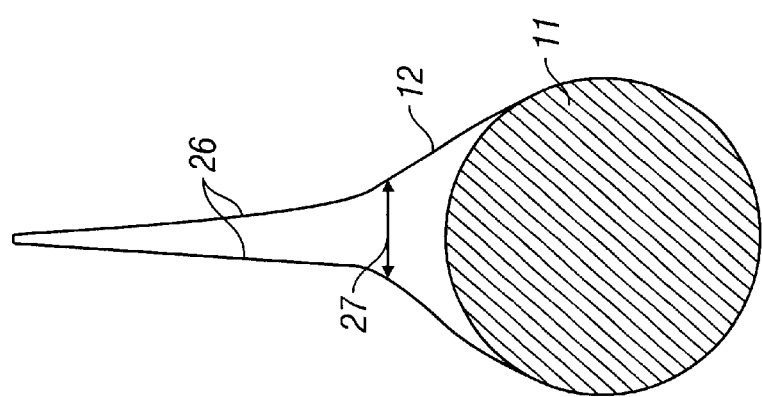
FIG. 2C is a cross-sectional view of a deployed DDDS assembly with a vacuum in the interior volume of the loop shield.

As shown in FIG. 2B, a preferred embodiment of the present invention incorporates vents 25 along loop shield 12, preferably along the outboard side. Vents 25 allow air to enter loop shield 12 while loop shield 12 is unfolding and expanding so that the layers of unfolding fabric do not cause a vacuum to form within loop shield 12. Avoiding such a vacuum is critical. As shown in FIG. 2C, a vacuum pulls the walls 26 of loop shield 12 inward and hinders the DDD 11 in reaching the intended final location. The vacuum also prevents the loop shield 12 from developing full tension and impact resistance. Additionally, pulling the loop shield walls 26 closer to each other reduces the safe distance 27 that the occupant's head can travel before striking the vehicle or impacting a structure on the opposite side of loop shield 12 and DDD 11.

FIG. 2C illustrates a vacuum condition in which loop shield walls 26 are 20 drawn in and the safe distance 27 is dangerously shortened. In an example using vents 25, FIG. 2D shows a loop shield 12 fully deployed in the intended final location, with an optimal safe distance 27 between the loop shield walls 26. The interior volume 28 of loop shield 12 in FIG. 2D contains air and not a vacuum.

Upon deployment of the DDD 11, the DDDS operates in the following manner. As best shown in FIGS. 1A and 1B, tear section 13 separates and releases cover 10, permitting loop shield 12 and DDD 11 to expand. Loop shield 12 unfolds as DDD 11 inflates and provides a smooth surface within which DDD 11 can deploy. The protective material of loop shield 12 prevents DDD 11 from catching or snagging on any vehicle interior features, which could cause improper orientation and twisting of DDD 11. Further, as deployment continues, loop shield 12 develops tension, controls the DDD's ultimate orientation and position, and limits the amount DDD 11 can overshoot its operational position. Reducing the overshoot, in turn, reduces system oscillation and provides more effective protection for the vehicle occupant. The system oscillation depends on the deployable length of DDD 11 and the system tension developed by the loop shield.

In addition to restricting oscillation, when the DDD is in its functional position, loop shield 12 develops significant tension along its span to improve occupant protection with an increased protective impact surface. The added protective surface area improves the restraint of the vehicle occupants and reduces the possibility of a partial ejection during a crash. Additionally, the material of loop shield 12 provides a protective barrier that prevents crash debris from entering the passenger compartment.

In a preferred embodiment of the present invention, loop shield 12 is positioned such that all foreseeable occupant sizes in normal seating positions are provided sufficient protection during a crash event. Also, in a preferred embodiment of the present invention, loop shield 12 is placed in areas where there is a potential for damage to DDD 11 by interior vehicle components. As shown in FIG. 2E, such potentially damaging vehicle components include, for example, headliner 211, roof rail 222, and B-pillar trim 233.

FIG. 2A shows other potentially damaging vehicle components including the A-pillar 20, B-pillar 21, and C-pillar 22 of a typical vehicle interior.

Figure 2G:
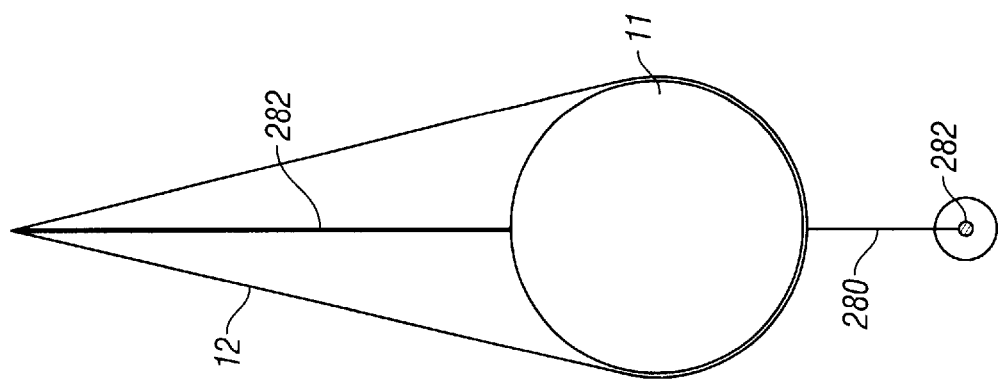
FIG. 2G is a cross-sectional view of the deployed DDDS assembly shown in FIG. 2F.
Figure 2F:
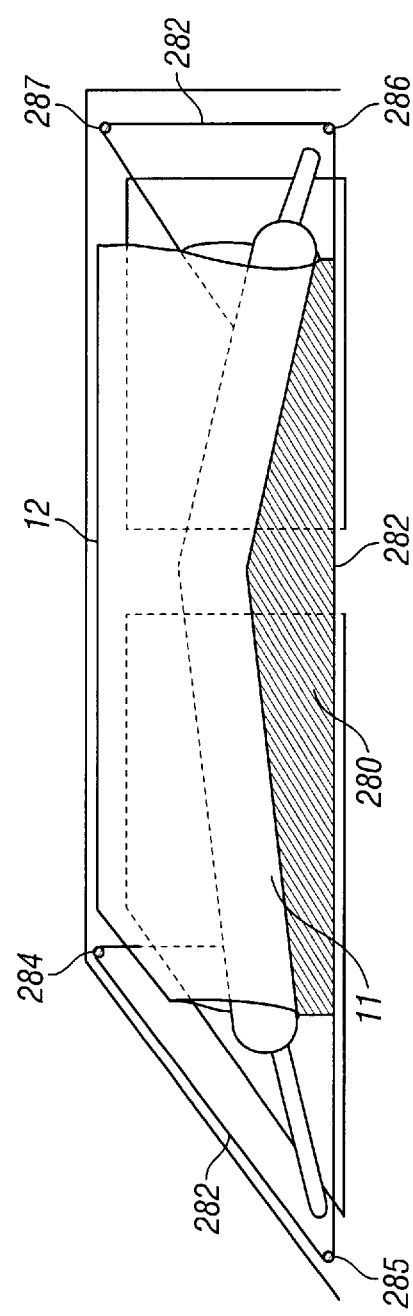
FIG. 2F is a schematic diagram of a deployed DDDS assembly with a fabric shield and fabric shield cord system, according to a preferred embodiment of the present invention.

As shown in FIG. 2F, in an alternate preferred embodiment of the present invention, a fabric shield 280 is attached to the bottom of loop shield 12 to further increase the protective area of the system. Fabric shield 280 covers the area of the window below the deployed DDD 11, reduces the possibility of partial ejection of vehicle occupant limbs, and adds another barrier preventing crash debris from entering the passenger compartment. Fabric shield 280 connects to the bottom of loop shield 12 and extends to the belt line of the vehicle. A fabric shield cord 282 runs through the bottom of fabric shield 280 to draw it down to the belt line when DDD 11 is deployed. To develop tension and draw fabric shield 280 down, fabric shield cord 282 is attached at both ends to the top of DDD 11 and is routed around fixed points 284, 285, 286, and 287 on the vehicle pillars. In this configuration, when DDD 11 deploys, the ends of fabric shield cord 282 are pulled down, fabric shield cord 282 travels around the fixed points 284, 285, 286, and 287, and fabric shield cord 282 is drawn tightly along the horizontal belt line between fixed points 285 and 286. With fabric shield cord 282 drawn tightly, fabric shield 280 is pulled down to the belt line. FIG. 2G illustrates a cross section of the deployed system shown in FIG. 2F. Optionally, fabric shield cord 282 can be routed around fixed points on the vehicle pillars on only one side of DDD 11, leaving the opposite side of fabric shield cord 282 attached on the pillar where the DDD cord is attached.

Figure 3D:
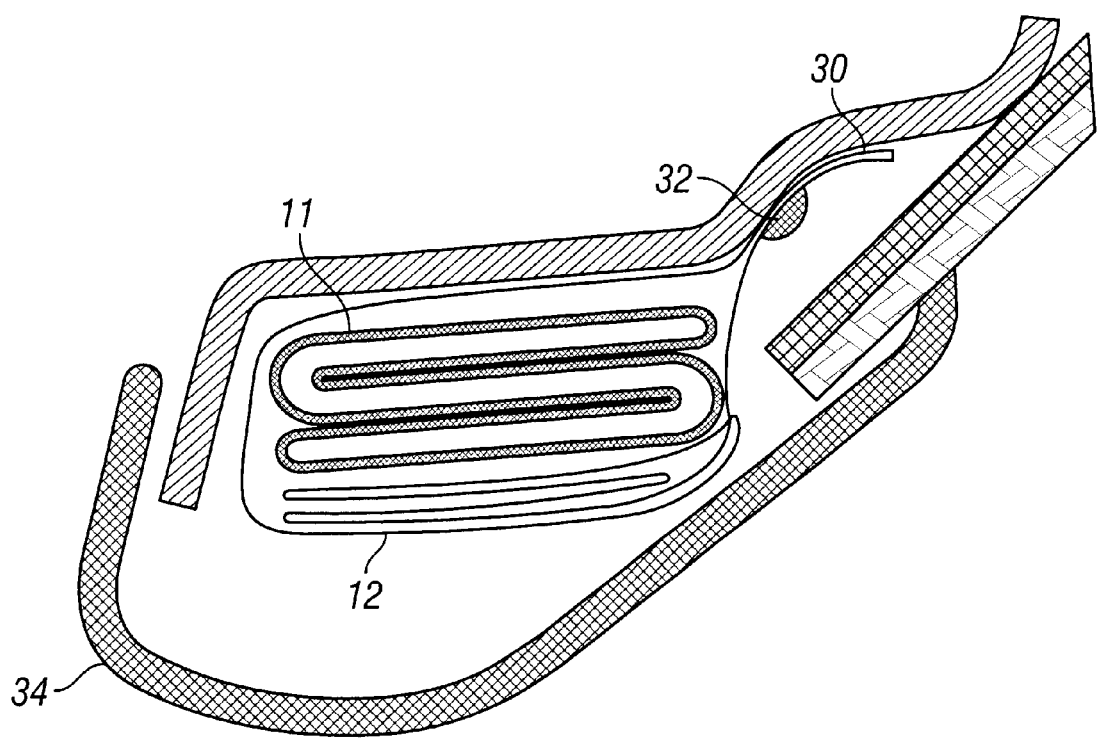
FIG. 3D is a cross section of an undeployed DDDS assembly attached with an attachment flap and housed inside vehicle trim, according to a preferred embodiment of the present invention.

DDD 11, loop shield 12, and cover 10 can be attached to the vehicle in a number of ways. Referring to FIGS. 3A and 3B, in a preferred embodiment, attachment flaps 30 extend from loop shield 12 and cover 10 through which fasteners (e.g., screws, tacks, plugs, and push-fittings) or stitches 15 are placed to secure the DDDS to the vehicle. Attachment flap 30 extends either above or beside the DDDS depending upon the specific configuration of the particular vehicle. FIG. 3A shows the DDDS attached at the top while FIG. 3B shows the DDDS attached on the side. FIG. 3C shows an example of a DDDS assembly that is attached with fasteners 32 through the holes in the attachment flap 30. FIG. 3D illustrates a cross section of a DDDS assembly attached with fasteners 32 through an attachment flap 30 and housed inside vehicle trim 34.

Figure 4A:
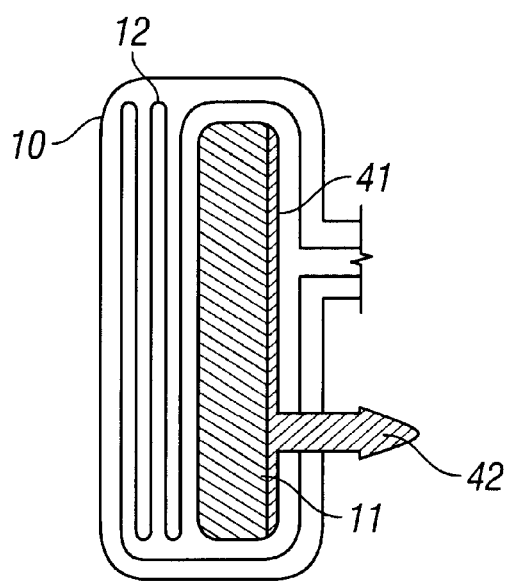
FIG. 4A is a cross-sectional view of a DDDS with a push-fitting stud plate, according to a preferred embodiment of the present invention.
Figure 4B:
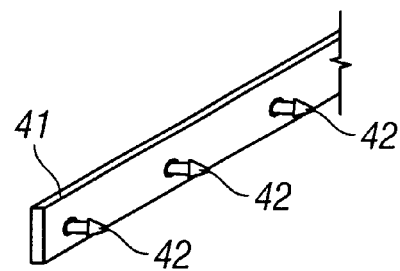
FIG. 4B is a schematic of a push-fitting stud plate, according to a preferred embodiment of the present invention.
Figure 4C:
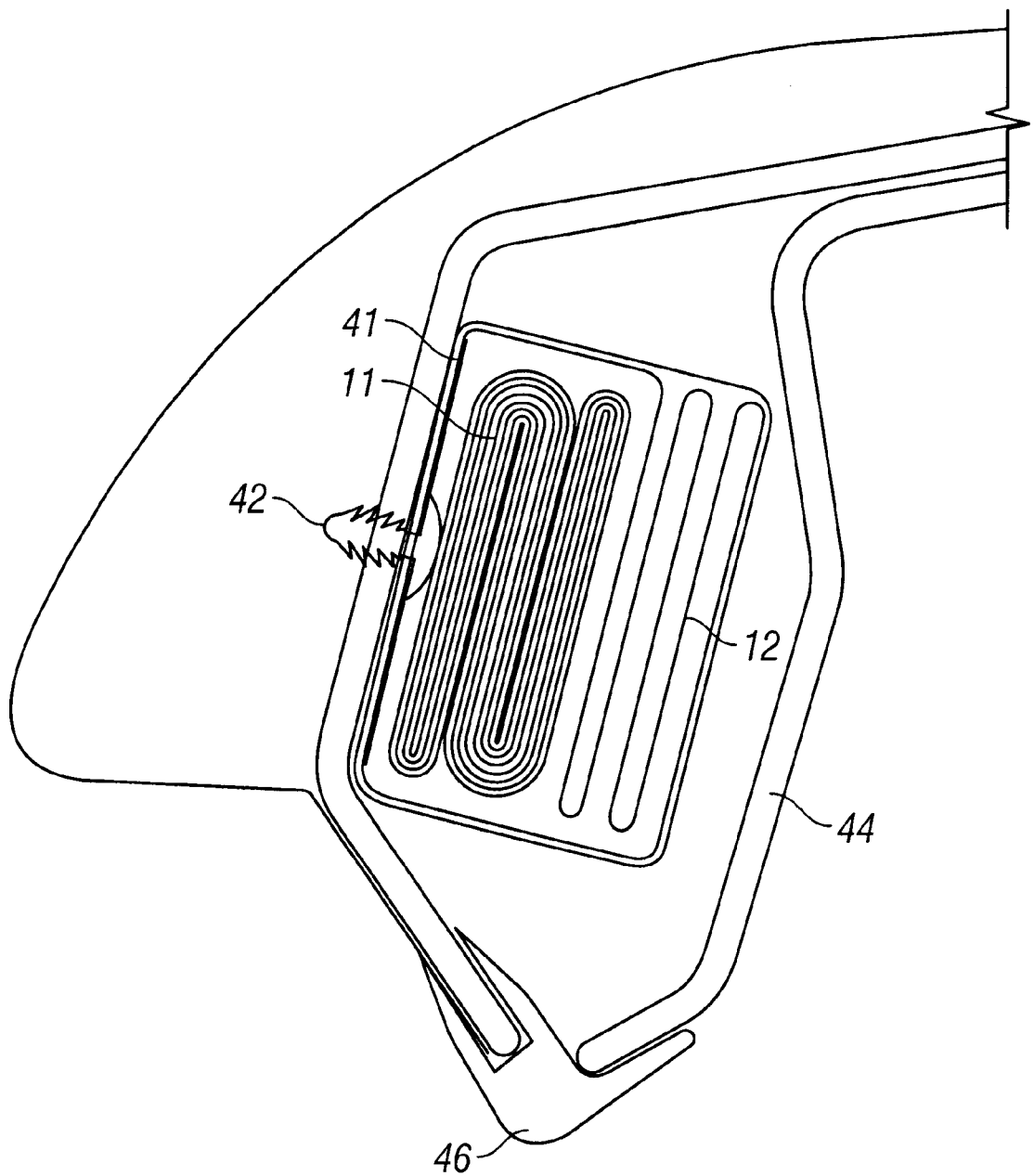
FIG. 4C is a cross section of an undeployed DDDS assembly attached with a push-fitting stud plate, according to a preferred embodiment of the present invention.

Another representative embodiment for attaching the DDDS to the vehicle is a system of mounting hardware. The mounting hardware may be fabricated in different ways, depending upon the vehicle configuration and intended use of the DDDS. For example, as shown in FIG. 4A, a push-fitting stud plate 41 attaches the DDDS to the vehicle. As shown in FIG. 4B, the push-fitting stud plate 41 comprises a long strip of rigid material with fasteners 42 integrally attached at incremental points along its longitudinal axis. In this application, the flat side of the push-fitting stud plate is placed against DDD 11. Loop shield 12 and integral cover 10 are wrapped around both the plate and DDD 11. DDDS loop shield 12 and cover 10 have holes through which the push-fitting stud plate fasteners 42 extend and attach the whole assembly to the vehicle structure. FIG. 4C shows a cross section of DDDS assembly attached with a push-fitting stud plate 41 and fasteners 42 and concealed within a headliner 44 and a trim component 46.

Figure 5:
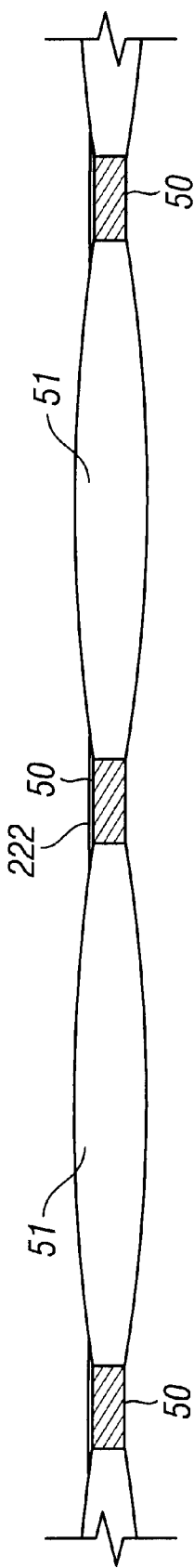
FIG. 5 is a schematic diagram of a DDDS assembly attached with clips, according to a preferred embodiment of the present invention.

As shown in FIG. 5, another embodiment of the present invention uses clips 50, preferably made of plastic. However, other materials may be used to make the clips. In this embodiment, clips 50 attach the DDDS at discrete locations to roof rail 222 of a vehicle.

Using clips presents some disadvantages. Between the discrete clip locations, there may be bulges 51 in the DDDS fabric as shown in FIG. 5. These bulges 51 do not impact the operation of the DDD. However, they may not be aesthetically pleasing to the vehicle owner. In a preferred embodiment using clips, there are several possible ways to eliminate these fabric bulges 51. Two examples are discussed below: (1) a spring element; and (2) a plastic strip.

Figure 6A:
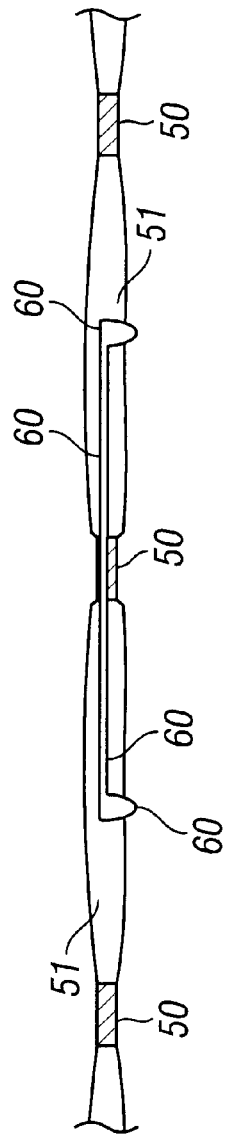
FIG. 6A is a schematic diagram of a DDDS assembly attached with clips and a spring element, according to a preferred embodiment of the present invention.

FIG. 6A illustrates the use of a spring element 60 to remove the fabric bulges 51. The spring element 60 is attached at the clip 50 and extends to the point equidistant between two discrete clip locations 50. Cantilevered from its attachment point at clip 50, spring 60 extends longitudinally along the inflatable assembly, pulls the fabric bulges 51 tight against the vehicle structure, and eliminates any unsightly appearance. The spring 60 is preferably made of a metallic material, such as piano-wire spring or other like materials.

Figure 6B:
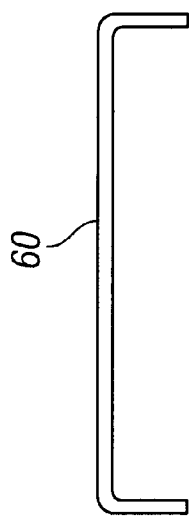
FIG. 6B is a schematic diagram of a spring element, according to a preferred embodiment of the present invention.

FIG. 6B shows an example of a preferred spring element 60 separated from the DDDS assembly for clarity.

Figure 6C:
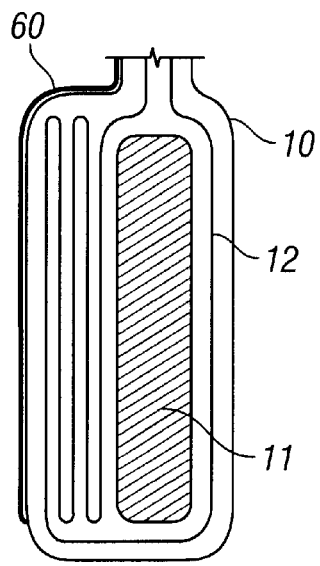
FIG. 6C is a cross section of the DDDS assembly shown in FIG. 6A.

FIG. 6C is a cross section of a DDDS assembly with a spring element 60, illustrating the way in which the spring element 60 eliminates the fabric bulges 51.

Figure 7A:
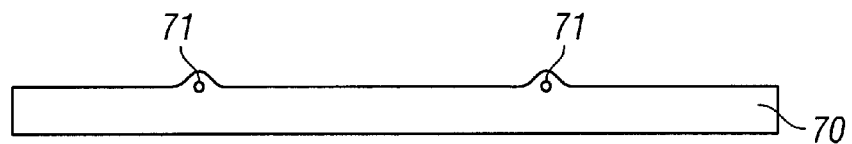
FIG. 7A is a schematic diagram of a curved plastic strip, according to a preferred embodiment of the present invention.

FIG. 7A shows another way to mitigate the fabric bulges that may appear when using the clip attachment method. A curved plastic strip 70 is attached through holes 71 at the clip locations 50. The curved plastic strip 70 extends longitudinally along the inflatable assembly, pulls against the fabric, and keeps it close to the vehicle structure, thereby eliminating the fabric bulges 51.

Figure 7B:
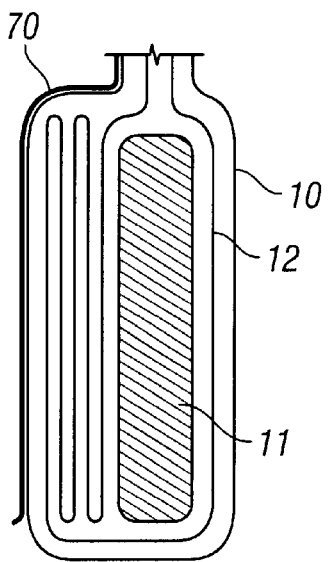
FIG. 7B is a cross section of a DDDS assembly attached with a curved plastic strip, according to a preferred embodiment of the present invention.

FIG. 7B is a cross section of a DDDS assembly with a curved plastic strip 70, illustrating the way in which the curved plastic strip 70 eliminates the fabric bulges 51.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An inflatable assembly comprising:
   (a) a dynamically deployed device;
   (b) a loop shield enveloping the dynamically deployed device, wherein prior to deployment of the dynamically deployed device, excess material of the loop shield is placed adjacent to the dynamically deployed device; and
   (c) a cover of substantially equal size to the dynamically deployed device in its uninflated state, the cover enclosing the loop shield and having a tear section.

2. The inflatable assembly of claim 1, wherein the tear section tears upon deployment of the dynamically deployed device.

3. The inflatable assembly of claim 1, wherein the loop shield and the cover are formed from a single piece of material.

4. The inflatable assembly of claim 1, wherein the loop shield has vents.

5. The inflatable assembly of claim 1, further comprising means for attaching the cover, the loop shield, and the dynamically deployed device to a vehicle.

6. The inflatable assembly of claim 5, wherein the loop shield further comprises:
   (i) a fabric shield attached to the loop shield on a side of the loop shield substantially opposite to the means for attaching; and
   (ii) a fabric shield cord attached to the fabric shield and the dynamically deployed device and routed around a set of fixed points on the vehicle such that when the dynamically deployed device inflates, the fabric shield cord and the fabric shield are pulled taut.

7. The inflatable assembly of claim 5, wherein the means for attaching comprises an attachment flap integral to the loop shield and the cover, and a plurality of fasteners that attach the inflatable assembly to the vehicle.

8. The inflatable assembly of claim 5, wherein the means for attaching comprises a push-fitting stud plate disposed in the loop shield and adjacent to the dynamically deployed device.

9. The inflatable assembly of claim 5, wherein the means for attaching the cover, the loop shield, and the dynamically deployed device comprises:
   (i) a clip enclosing the loop shield, the cover, and the dynamically deployed device, and attaching the loop shield, the cover, and the dynamically deployed device to the vehicle; and
   (ii) a spring element cantilevered from an attachment point on the clip extending longitudinally along the inflatable assembly to draw the inflatable assembly to the vehicle.

10. The inflatable assembly of claim 9, wherein the spring element is a metal piano-wire spring.

11. The inflatable assembly of claim 5, wherein the means for attaching the cover, the loop shield, and the dynamically deployed device comprises:
   (i) a clip enclosing the loop shield, the cover, and the dynamically deployed device, and attaching the loop shield, the cover, and the dynamically deployed device to the vehicle; and
   (ii) a curved plastic strip extending longitudinally along the inflatable assembly to draw the inflatable assembly to the vehicle.

12. The inflatable assembly of claim 1, wherein the loop shield is made of woven nylon.

13. A protective assembly for a dynamically deployed device comprising:
   (a) a loop shield enveloping the dynamically deployed device, wherein the loop shield is sized to guide deployment of the dynamically deployed device, and wherein, prior to the deployment, the loop shield is folded and placed adjacent to the dynamically deployed device;
   (b) a cover enclosing the loop shield, wherein the size of the cover substantially equals the size of the dynamically deployed device in an uninflated state; and
   (c) means for attaching the loop shield and the cover to a vehicle.

14. The protective assembly of claim 13, wherein the loop shield has vents.

15. The protective assembly of claim 14, wherein the vents are located only on a side of the loop shield closest to the vehicle.

16. The protective assembly of claim 14, wherein the vents are located only on a side of the loop shield farthest from the vehicle.

17. The protective assembly of claim 13, wherein the cover has a tear section that detaches upon deployment of the dynamically deployed device to release the cover and to permit the loop shield and the dynamically deployed device to expand.

18. The protective assembly of claim 13, wherein the loop shield further comprises:

(i) a fabric shield attached to the loop shield on a side of the loop shield substantially opposite to the means for attaching; and (ii) a fabric shield cord attached to the fabric shield and the dynamically deployed device and routed around a set of fixed points on the vehicle such that when the dynamically deployed device inflates, the fabric shield cord and the fabric shield are pulled taut.

19. The protective assembly of claim 13, wherein the means for attaching the loop shield and the cover is stitching.

20. The protective assembly of claim 13, wherein the means for attaching the loop shield and the cover is a system of mounting hardware.

21. The protective assembly of claim 20, wherein the system is a push-fitting stud plate.

22. A method for protecting, controlling, and adding a protective impact surface to a dynamically deployed device comprising the steps of:

(a) enclosing the dynamically deployed device in a loop shield when the dynamically deployed device is uninflated, wherein the loop shield is of a size substantially equal to the dynamically deployed device in its inflated state, and wherein the loop shield has extra material when the dynamically deployed device is uninflated;

(b) folding the extra material of the loop shield to form a folded portion of the loop shield;

(c) placing the folded loop shield portion of the loop shield adjacent to the dynamically deployed device; and (d) attaching the loop shield and the enclosed dynamically deployed device to a vehicle.

23. The method of claim 22, further comprising the steps of:

(e) enclosing the loop shield and the dynamically deployed device in a cover, wherein the size of the cover substantially equals the size of the dynamically deployed device in an uninflated state, and wherein the cover has a tear section; and (f) attaching the cover to the vehicle.

24. The method of claim 23, wherein the step of attaching the loop shield and the dynamically deployed device and the step of attaching the cover comprise the steps of:

(i) providing an attachment flap;

(ii) placing a plurality of fasteners through the attachment flap; and (iii) attaching the plurality of fasteners to the vehicle.

25. The method of claim 23, wherein the step of attaching the loop shield and the dynamically deployed device and the step of attaching the cover comprise the steps of:

(i) inserting a push-fitting stud plate inside the cover and the loop shield and adjacent to the dynamically deployed device, the push-fitting stud plate having a plurality of integral fasteners, the plurality of integral fasteners penetrating the cover and the loop shield; and (ii) attaching the plurality of integral fasteners to the vehicle structure.

26. The method of claim 25, wherein the plurality of integral fasteners penetrates the cover and the loop shield.

27. The method of claim 22, wherein the loop shield has vents.

28. The method of claim 23, wherein the loop shield and the cover are formed from a single piece of material.

29. The method of claim 22, farther comprising the steps of:

(i) attaching a fabric shield to the loop shield;

(ii) attaching a fabric shield cord to the fabric shield and the dynamically deployed device; and (iii) routing the fabric shield cord around a set of fixed points on the vehicle such that when the dynamically deployed device inflates, the fabric shield cord and the fabric shield are pulled taut.

30. A method for deploying a dynamically deployed device comprising the steps of:

(a) enveloping the dynamically deployed device in a dynamically deployed device shield attached to a vehicle;

(b) inflating the dynamically deployed device;

(c) guiding the dynamically deployed device during inflation with the dynamically deployed device shield;

(d) restraining the dynamically deployed device after inflation with the dynamically deployed device shield to prevent the dynamically deployed device from overshooting an intended deployment location;

(e) holding the dynamically deployed device in the intended deployment location with the dynamically deployed device shield; and (f) pulling the dynamically deployed device shield taut to supplement the dynamically deployed device with a protective impact surface.

31. The method of claim 30, wherein step (a) comprises:

(i) attaching a first end of the dynamically deployed device shield to a vehicle attachment point;

(ii) wrapping the dynamically deployed device shield around the dynamically deployed device; and (iii) attaching a second end of the dynamically deployed device shield to the vehicle attachment point.

32. The method of claim 31, wherein step (a) further comprises:

(iv) attaching a first end of a cover to the vehicle attachment point, the cover having a tear section;

(v) wrapping the cover around the dynamically deployed device and the dynamically deployed device; and (vi) attaching a second end of the cover to the vehicle attachment point.

33. The method of claim 32, wherein the tear section is adapted to tear upon inflation of the dynamically deployed device.

34. A method for deploying a dynamically deployed device comprising the steps of:

(a) inflating the dynamically deployed device within a loop shield, wherein the loop shield is enclosed in a cover;

(b) removing the cover to allow the dynamically deployed device and the loop shield to expand; and (c) pulling the loop shield taut with the expanded dynamically deployed device to provide a protective impact surface.

35. The method of claim 34, further comprising the step of using the loop shield to guide and protect the dynamically deployed device during inflation.

36. The method of claim 35, wherein the step of using the loop shield to guide and protect comprises venting the loop shield to allow air to enter the loop shield.

37. A shield for a dynamically deployed device comprising:

(a) a loop of material enclosing the dynamically deployed device, wherein the loop of material has an interior volume larger than a volume of the dynamically deployed device in an inflated state; and (b) a means for attaching the loop of material to a vehicle structure, wherein the loop of material guides the dynamically deployed device during deployment, protects the dynamically deployed device against vehicle components, and holds the dynamic deployed device in an intended deployment position.

38. The shield of claim 37, wherein the loop of material is made of woven nylon fabric.

39. The shield of claim 37, wherein the loop of material incorporates vents that allow air to enter the loop of material.

40. The shield of claim 37, wherein the means for attaching the loop of material to the vehicle structure is one of stitching, a fastener, and a push-fitting stud plate.

41. The shield of claim 37, further comprising:

(c) a fabric shield attached to the loop of material on a side of the loop of material substantially opposite to the means for attaching; and (d) a fabric shield cord attached to the fabric shield and the dynamically deployed device, wherein when the dynamically deployed device inflates, the dynamically deployed device pulls the fabric shield cord and draws the fabric shield tight.

* * * * *